(12) United States Patent
Ohara et al.

(10) Patent No.: US 7,069,622 B2
(45) Date of Patent: Jul. 4, 2006

(54) HINGE AND IMAGE INPUT/OUTPUT APPARATUS THEREWITH

(75) Inventors: Toshimitsu Ohara, Nagano (JP); Yasushi Utsugi, Nagano (JP); So Ishikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 10/675,457

(22) Filed: Sep. 29, 2003

(65) Prior Publication Data

US 2004/0117948 A1 Jun. 24, 2004

(30) Foreign Application Priority Data

Sep. 27, 2002 (JP) ............................ P2002-283272
Sep. 27, 2002 (JP) ............................ P2002-283288

(51) Int. Cl.
*E05F 1/08* (2006.01)

(52) U.S. Cl. .............................. 16/286; 16/289; 16/292

(58) Field of Classification Search .................. 16/286, 16/289, 292, 337, 342, 345, 335, 326, 327, 16/239, 242, 284, 312; 358/494, 496, 497; 399/380; 355/75
See application file for complete search history.

(56) References Cited

U.S. PATENT DOCUMENTS 3,452,388 A * 7/1969 Stone ........................... 16/290
4,424,606 A * 1/1984 Sorimachi .................... 16/223
4,884,317 A * 12/1989 Liu .............................. 16/289
6,100,963 A * 8/2000 Hosaka ........................ 355/75
6,393,664 B1 * 5/2002 Habegger et al. ............. 16/335

FOREIGN PATENT DOCUMENTS

| GB | 2086979 A | * | 5/1982 |
| JP | 57070526 A | * | 5/1982 |
| JP | 03171160 A | * | 7/1991 |
| JP | 2001-098839 | | 4/2001 |

* cited by examiner

*Primary Examiner*—Chuck Y. Mah
*Assistant Examiner*—Michael J. Kyle
(74) *Attorney, Agent, or Firm*—John J. Penny, Jr.; Edwards Angell Palmer & Dodge LLP

(57) ABSTRACT

A hinge includes a tubular base part being attached to a main body or an open/closed body, a rotation body being attached to the main body or the open/closed body, which is not attached to the base part, and supported on side wall end parts of the base part opposed to each other for rotation, the rotation body having a cam part, a wedge body being reciprocatably housed in the base part and having a slope for coming in sliding contact with the cam part when the rotation body rotates, an elastic member being housed in the base part for urging the wedge body toward the side of the rotation body, a sliding contact face being formed on the side of the wedge body from a rotation axis of the rotation body on an inner wall of the base part and bent to a concave corresponding to a parallel move path of a line almost parallel with the rotation axis, and a sliding contact part being formed in the rotation body for coming in sliding contact with the sliding contact face when the rotation body rotates.

11 Claims, 13 Drawing Sheets

HINGE AND IMAGE INPUT/OUTPUT APPARATUS THEREWITH

The present application is based on Japanese Patent Applications Nos. 2002-283272 and 2002-283288, the entire contents of which are incorporated herein by reference.

BACKGROUND OF THE INVENTION

1. Field of the Invention

This invention relates to a hinge and an image input/output apparatus using the hinge.

2. Related Art

A multifunction processing machine including a printer and an image scanner as an image reader in one piece is known as an image input/output apparatus. Known among such multifunction processing machines is a machine having a scanner housing for housing an image scanner as an open/closed body and a printer housing for housing a printer as a main body, both the scanner housing and the printer housing being swingably joined on a hinge.

However, with the multifunction processing machine including the scanner housing and the printer housing swingably joined, the scanner housing for housing the image scanner is heavy and there is a danger that the scanner housing may rapidly drop in a closed direction under its own weight and a user's finger may be caught in. Thus, a hinge including a brake mechanism is used to join a scanner housing and a printer housing in a related art (for example, refer to Japanese Patent Publication No. JP-A-2001-98839).

In the related art, a wedge body and an elastic member as urging device are housed in a base part of the hinge and the wedge body is urged toward the side of a rotation body by the elastic member for bringing the slope of the wedge body into sliding contact with a cam part of the rotation body, thereby adding the rotation force to the rotation body in the direction of bringing the scanner housing away from the printer housing, thereby preventing drop of the scanning housing in the closing direction thereof.

FIG. 13 is a drawing to show the hinge 5 in the related art. In the hinge 5, the upper end margin of a fixed-side hinge body 52 is formed as a convex circular arc margin with the shaft hole center as the circular arc center, and a small protrusion. 53 is provided in the circumferential direction of the convex circular arc margin. A moving-side hinge body 54 is formed with a concave circular arc face with the shaft hole center as the circular arc center, and a raised step part 55 is formed on the concave circular arc face. According to the hinge 5, the raised step part 55 mounts the protrusion 53 in the process of closing the moving-side hinge body 54, so that a predetermined frictional force can be produced between the raised step part 55 and the protrusion 53. The hinge 5 uses the frictional force to brake pivotal movement of closing the open/closed body. Therefore, the hinge 5 can prevent rapid drop in the closing process of the heavy open/closed body.

However, since the protrusion 53 and the raised step part 55 are brought into sliding contact with each other, the moving-side hinge body 54 needs to be provided with a portion 51 covering the upper end margin of the fixed-side hinge body 52, as shown in FIG. 13. Further, the portion 51 covering the outer peripheral margin receives a strong force from the protrusion 53 and therefore must be made large so as to provide strength. Thus, the hinge 5 involves a problem of enlarging its shape accordingly.

The hinge 5 also involves a problem of more enlarging its shape if the open/closed body becomes heavier. Specifically, if the open/closed body becomes heavier, a larger frictional force becomes necessary. In the hinge 5, if an attempt is made to increase only the frictional force without changing the size of the hinge, degradation of the protrusion 53 is promoted due to wear. Thus, to brake the heavier open/closed body, it is necessary to lengthen the distance between the protrusion 53 and the shaft hole center so as to provide larger moment in the opening direction without changing the magnitude of the frictional force. Therefore, the shape must be enlarged. The expression "moment in the opening direction" mentioned here is used to mean the rotation force acting in the direction of bringing the scanner housing away from the printer housing.

Further, if the rotation force is added to the rotation body, a rotation force in the opposite direction to the rotation body is added to the wedge body by the reaction force. Accordingly, the rotation force in the opposite direction to the rotation body is added to the base part, which cannot resist the weight of the image scanner and is broken or warped; this is a problem. Thus, in the related art, a fix member is used to reinforce the base part, for example.

FIG. 14 is a schematic drawing to show an example of a reinforcement structure of a base part in a related art. As shown in the figure, in the related art, an L-shaped metal sheet 62 as a fix member is attached to a printer housing 61. The bottom of the L-shaped metal sheet 62 is fixed to the bottom of the printer housing 61 with a plurality of screws, etc., and an opposite portion of the L-shaped metal sheet 62 is fixed to the ceiling of the printer housing 61 with a plurality of screws, etc. To reinforce a base part 63, the base part 63 is fixed to the L-shaped metal sheet 62 with a plurality of screws, etc.

However, since the fix member to reinforce the base part 63 in the reinforcement structure in the related art, the number of parts is increased and in addition, an attachment step becomes necessary, increasing the manufacturing cost of the multifunction processing machine; this is a problem.

Further, in the multifunction processing machine in the related art, a rotation body 66 is fixed to a side wall and the bottom of a scanner housing 64. Since the side wall and the bottom are contiguous with each other, if the rotation body 66 is fixed to the side wall and the bottom, the weight of the scanner housing 64 concentrates almost on one pole. Thus, in the related art, as shown in the figure, an L-shaped metal sheet 65 as another fix member is provided for the scanner housing 64, thereby reinforcing the side wall and the bottom to which the rotation body 66 is attached; there is also a problem of furthermore increasing the number of parts.

SUMMARY OF THE INVENTION

It is therefore an object of the invention to provide a hinge whose shape can be miniaturized while preventing rapid drop of an open/closed body in a closing process, and to provide an image input/output apparatus whose open/closed body is attached by a simplified structure using the hinge.

(1) According to at least one embodiment of the invention, there is provided a hinge including a tubular base part being attached to a main body or an open/closed body; a rotation body being attached to the main body or the open/closed body, which is not attached to the base part, and supported on side wall end parts of the base part opposed to each other for rotation, the rotation body having a cam part; a wedge body being reciprocatably housed in the base part and having a slope for coming in sliding contact with the cam part when the rotation body rotates; an elastic member being housed in the base part for urging the wedge body toward the side of the rotation body; a sliding contact face being formed on the side of the wedge body from a rotation axis of the rotation body on an inner wall of the base part and bent to a concave corresponding to a parallel move path of a line almost parallel with the rotation axis; and a sliding contact part being formed in the rotation body for coming in sliding contact with the sliding contact face when the rotation body rotates. According to the hinge, as the wedge body is urged toward the side of the rotation body by the elastic member, the moment in the opening direction is made to act on the open/closed body; in addition, the frictional force produced as the sliding contact part comes in sliding contact with the sliding contact face can act as the moment in the opening direction against the moment in the closing direction when the open/closed body is closed. Accordingly, the hinge makes it possible to prevent rapid drop of the open/closed body in the closing direction thereof. Further, in the hinge, the sliding contact part and the sliding contact face come in sliding contact with each other in the base part for producing the frictional force required for braking, so that it is not necessary to provide the rotation body with any portion covering the upper end margin of the base part on the opening side thereof to produce a frictional force. Thus, the hinge makes it possible to miniaturize the rotation body.

(2) The hinge of at least one embodiment of the invention is characterized by the fact that the sliding contact part is formed in the proximity of the tip of the cam part. If the sliding contact part is formed in the proximity of the tip of the cam part, the distance between the sliding contact part and the rotation axis of the rotation body can be lengthened. If the distance is lengthened, the moment in the opening direction of the open/closed body can be increased as the same frictional force is applied. Therefore, a heavier open/closed body can be braked as compared with a hinge wherein the distance between the sliding contact part and the rotation axis is short. Conversely, the open/closed body of the same weight can be braked with a smaller hinge as compared with the hinge wherein the distance between the sliding contact part and the rotation axis is short. Thus, according to the hinge of the embodiment invention, the shape can be furthermore miniaturized.

(3) The hinge of at least one embodiment of the invention is characterized by the fact that the wedge body is pressed into the base part. According to the hinge, when the open/closed body is closed, the frictional force occurring between the wedge body and the base part gives the moment in the opening direction to the rotation body, so that rapid drop of the open/closed body in the closing direction thereof can be furthermore prevented.

(4) The hinge of at least one embodiment of the invention is characterized by the fact that the sliding contact face and the sliding contact part are not pressed against each other when the open/closed body is in a fully closed position or in a fully open position. According to the hinge, the sliding contact part is not pressed and does not become elastically deformed in the fully closed position or in the fully open position, so that needless degradation of the sliding contact part can be prevented.

(5) The hinge of at least one embodiment of the invention is characterized by the fact that the distance from the rotation axis to an arbitrary point on the sliding contact face varies so that a frictional force occurring between the sliding contact part and the sliding contact face varies in response to the rotation angle of the rotation body. The hinge makes it possible to vary the frictional force in response to the angle of the open/closed body.

(6) According to at least one embodiment of the invention, there is provided an image input/output apparatus including a first housing for housing a printing unit; a second housing being placed on the top of the first housing for housing an image read unit; and the hinge as described above for swingably joining the second housing to the first housing. According to the image input/output apparatus, the second housing and the first housing can be joined by the small hinge while preventing rapid drop of the second housing in the closing process.

(7) According to at least one embodiment of the invention, there is provided an image input/output apparatus including a first housing having a tube part being extended like a tube in a bottom direction from an opening formed in a ceiling, the first housing for housing a printing unit; a second housing being placed on the top of the first housing for housing an image read unit; and a hinge for swingably joining the second housing to the first housing, the hinge having a base part being fitted into the tube part, a rotation body being attached to the second housing and supported on the base part for rotation, and urging device for adding a rotation force to the rotation body in a direction of bringing the second housing away from the first housing and adding a rotation force in the opposite direction to the rotation body to the base part. According to the image input/output apparatus, the base part is inserted into the tube part and is reinforced. Thus, if the rotation force in the opposite direction to the rotation body 11 is added to the base part 14, breakage or warpage is hard to occur. Therefore, a fix part to reinforce the base part need not be used. Thus, according to the image input/output apparatus, the structure can be simplified.

(8) The image input/output apparatus is characterized by the fact that the tube part is held or fixed to the bottom of the first housing. If the bottom of the tube part is held or fixed to the bottom of the first housing, the base part can be reinforced more firmly.

(9) The image input/output apparatus is characterized by the fact that the tube part has an attachment part being fixed to the top face of the first housing. According to the image input/output apparatus, the base part is fixed to the top face of the first housing and thus can be easily removed without disassembling the first housing. Therefore, when the second housing is removed from the first housing in maintenance, the second housing can be easily removed as the base part is removed; maintainability is enhanced.

(10) The image input/output apparatus is characterized by the fact that the rotation body is fixed to the ceiling or the bottom of the second housing. According to the image input/output apparatus, the weight of the second housing is distributed between the ceiling and the bottom, so that the rotation body can be attached without reinforcement of a fix member. Therefore, the number of parts can be furthermore decreased. Thus, the structure can be furthermore simplified.

(11) The image input/output apparatus is characterized by the fact that the rotation body is fixed to one of the ceiling and the bottom of the second housing and is held to the other. According to the image input/output apparatus, the rotation body can be attached without reinforcement of a fix member and in addition, the rotation body is held only to the other, so that a fixing part, such as a screw, becomes unnecessary. Thus, the structure can be furthermore simplified.

DETAILED DESCRIPTION OF THE PREFERRED EMBODIMENTS

Referring now to the accompanying drawings, there is shown a preferred embodiment of the invention.

First Embodiment

Figure 2:
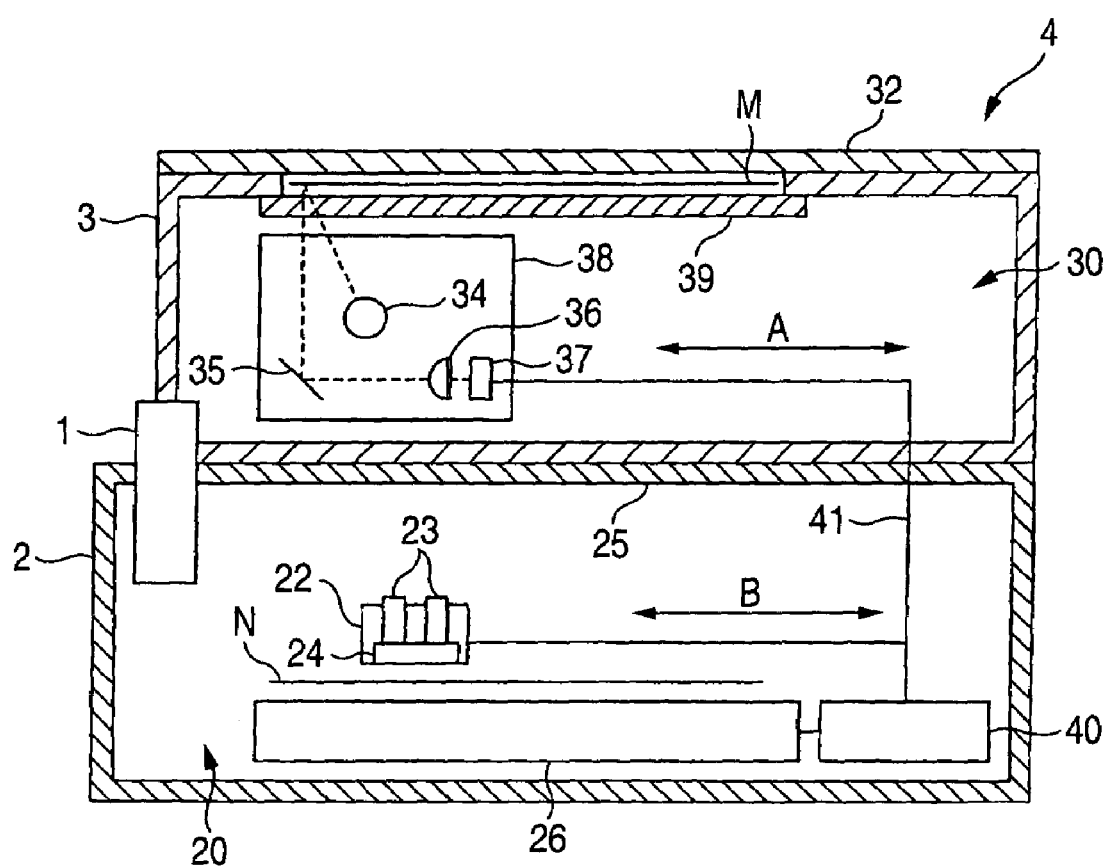
FIG. 2 is a schematic drawing of an image input/output apparatus using the hinge according to the first embodiment of the invention.

FIG. 2 is a schematic drawing to show a multifunction processing machine 4 as an image input/output apparatus using a hinge 1 according to the first embodiment of the invention. The multifunction processing machine 4 includes a scanning section 30 as image read unit and a print section 20 as printing unit. The scanning section 30 implements an image read function as an image scanner, and the print section 20 implements an image printout function as a printer. Further, the multifunction processing machine 4 also implements a function as an electronic copier by printing an image read through the scanning section 30 in the print section 20

A scanner housing 3 as an open/closed body houses the scanning section 30. The scanner housing 3 is formed of a resin, etc., like a box and includes an original bed 39 on the opposite side to the printer housing 2, forming a flat-bed scanner. An original bed cover 32 for covering the board face of the original bed 39 is mounted swingably on the outside of the scanner housing 3. The scanning section 30 is made up of a carriage 38, a light source 34, a mirror 35, a lens 36, a linear image sensor 37, etc. The carriage 38 is placed reciprocatably in the horizontal direction parallel with the board face of the original bed 39 for transporting the optical system made up of the light source 34, the mirror 35, and the lens 36 and the linear image sensor 37 in A direction. The optical system forms the reflected light image of a subject M to which light is applied from the light source 34 on the linear image sensor 37 through the mirror 35 and the lens 36, as indicated by the dashed line.

The printer housing 2 as a main body houses the print section 20. The printer housing 2 is formed of a resin, etc., like a box for swingably supporting the scanner housing 3 on the side of a top plate 25. Accordingly, the scanner housing 3 is placed on the top of the printer housing 2. A carriage 22 of the print section 20 is placed reciprocatably in the horizontal direction for transporting a plurality of cartridges 23 and a record head 24 mounted on the carriage 22 in B direction. Ink stored in each cartridge 23 is jetted onto print paper N in droplet form through the record head 24. A transport-mechanism 26 of the print section 20 transports the print paper N supplied to a paper feed port (not shown) in the printer housing 2 to a predetermined print position. Further, the transport mechanism 26 ejects the print paper N with an image printed through the record head 24 from a paper ejection port (not shown) in the printer housing 2.

A control section 40 generates image data representing a subject image based on an output signal of the linear image sensor 37 input through a cable 41. Further, the control section 40 controls the operation of the transport mechanism 26 and the record head 24 based on the generated image data, thereby printing an image representing the subject image on the print paper N.

Figure 3:
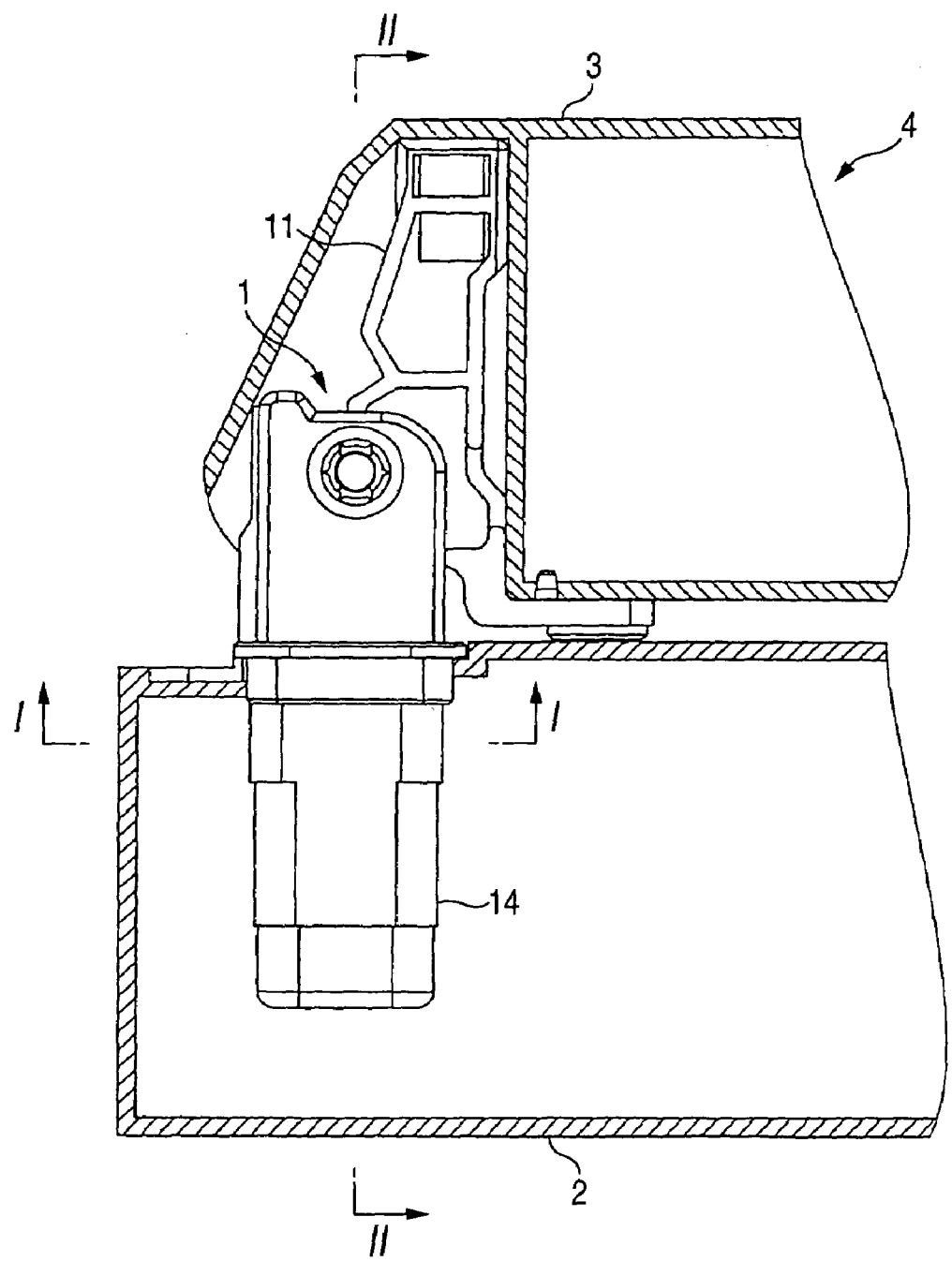
FIG. 3 is a drawing to show a state in which the hinge according to the first embodiment of the intention is attached to the image input/output apparatus on an enlarged scale.

FIG. 3 is a drawing to show a state in which the hinge 1 according to the embodiment of the invention is attached to the multifunction processing machine 4 on an enlarged scale. In the embodiment, a base part 14 of the hinge 1 is attached to the printer housing 2 as the main body of the multifunction processing machine 4, and a rotation body 11 is attached to the scanner housing 3 as the open/closed body. The base part 14 may be attached to the scanner housing 3 and the rotation body 11 may be attached to the printer housing 2.

Figure 4:
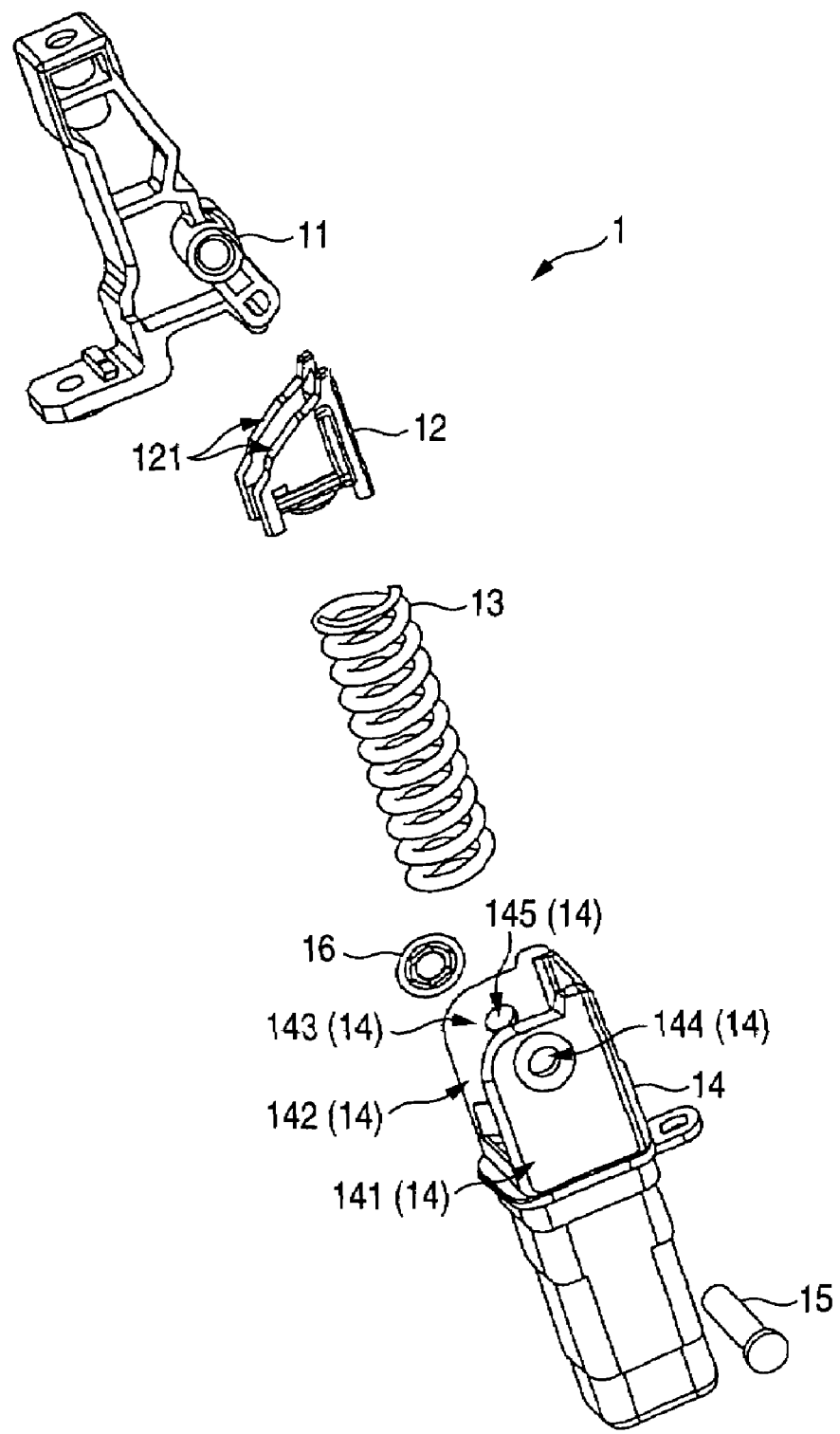
FIG. 4 is a drawing to describe the configuration of the hinge according to the first embodiment of the invention for swingably joining a scanner housing and a printer housing.

FIG. 4 is a drawing to describe the configuration of the hinge 1 for swingably joining the scanner housing 3 and the printer housing 2. The hinge 1 include the rotation body 11, a wedge body 12, a helical compression spring 13 as an elastic member, a base part 14, a metal shaft 15, and a ring member 16 for preventing detachment of the metal shaft 15. The helical compression spring 13 and the wedge body 12 are housed in the base part 14 in this order and after they are housed, the rotation body 11 is joined to the base part 14 for rotation with the metal shaft 15.

The base part 14 is formed of a raw material of polyacetal, etc., like a closed-end pipe, and has an opening 143. The base part 14 is roughly square in cross section taken on line I—I in FIG. 3, and has four side walls. Shaft holes 144 and 145 for allowing the metal shaft 15 to pierce are formed in end parts of a pair of side walls 141 and 142 opposed to each other on the opening 143 side. One of the walls of the base part 14 not formed with the shaft hole 144 or 145 is removed from the opening for attaching the rotation body 11 to a sliding contact face described later.

The wedge body 12 has slopes 121 for coming in sliding contact with a cam part 112 described later, and is housed reciprocatably in the base part 14. The wedge body 12 has a bottom shaped roughly like a rectangle, and each of the longitudinal and lateral widths of the bottom is formed longer than the distance between inner wall faces of the side walls of the base part 14. Therefore, the wedge body 12 is pressed into the base part 14 at the assembling time and a frictional force occurs between the wedge body 12 and the inner wall face of the base part 14 at the reciprocating time.

To close the scanner housing 3, the frictional force gives moment in the opening direction to the rotation body 11.

Figure 5:
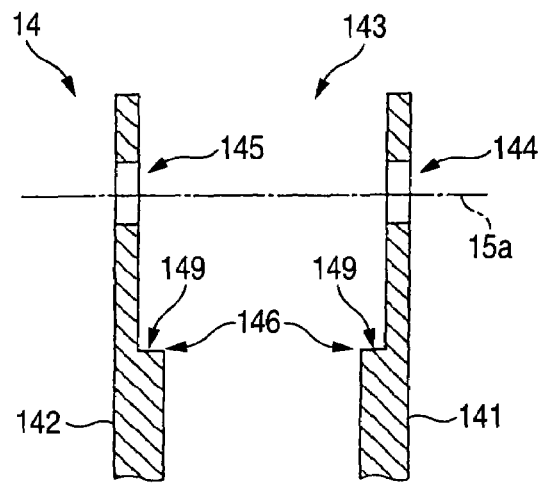
FIG. 5 is a sectional view of a side wall end part of a base part of the hinge according to the first embodiment of the invention.

FIG. 5 is a sectional view to show the cross section on the opening side in the cross section taken on line II—II in FIG. 3. Steps 146 overhanging to the inside of the base part 14 are provided on the side opposite to the opening from rotation axis center 15a of the side walls 141 and 142, and step faces 149 facing the opening side are formed. The step faces 149 are formed so as to cross the wall faces of the side walls 141 and 142 almost perpendicularly, as shown in FIG. 5.

Figure 1:
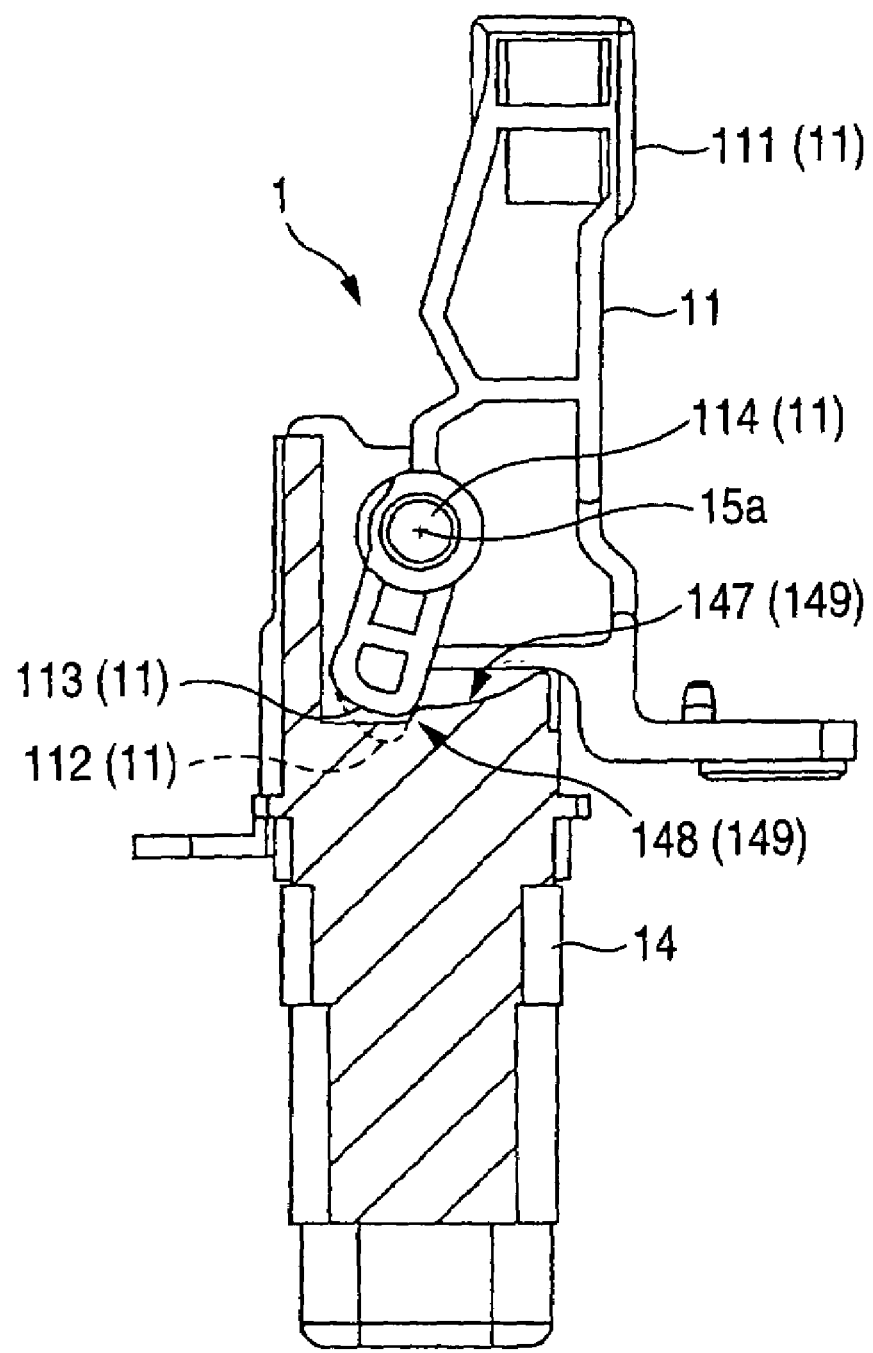
FIG. 1 is a sectional view to show a sliding contact part and a sliding contact face in a fully closed position of a hinge according to the first embodiment of the invention.

FIG. 1 is a sectional view to show a sliding contact part and a sliding contact face. FIG. 1 represents the hinge 1 when the scanner housing 3 is in a fully closed position. The step face 149 is formed with a step 148 as shown in the figure, and the face of the step face 149 higher than the step 148 by a predetermined height on the right of the step 148 is a sliding contact face 147. The sliding contact face 147 is a face for producing a predetermined frictional force as a sliding contact part 113 described later comes in sliding contact with the sliding contact face 147, and is formed roughly like a concave circular arc with the rotation axis center 15a of the metal shaft 15 (as the rotation axis) as the circular arc center. That is, the sliding contact face 147 is formed as a face bent to a concave corresponding to the parallel move path of the line almost parallel with the rotation axis center 15a. The distance between an arbitrary point on the sliding contact face 147 and the rotation axis center 15a is not constant and is set so that the frictional force occurring between the sliding contact part 113 and the sliding contact face 147 varies in response to the rotation angle of the rotation body 11. For example, at one angle, the distance is set short so as to lessen the frictional force; at another angle, the distance is set long so as to increase the frictional force. Accordingly, the frictional force varies in response to the angle. For example, if the distance is set so that the frictional force lessens at an angle close to the fully open position, closing operation can be started with a small closing operation force.

The rotation body 11, which is made of nylon, etc., has an L-shaped attachment board part 111 screwed to the rotation base end side of the scanner housing 3 and the cam part 112 projecting in the diametrical direction of the rotation body 11 and is formed with the sliding contact part 113 for coming in sliding contact with the sliding contact face 147 and a bearing part 114 for allowing the metal shaft 15 to pierce. As the metal shaft 15 pierces the bearing part 114, the rotation body 11 is supported on the end parts of the side walls 141 and 142 of the base part 14 opposed to each other for rotation. The rotation body 11 may be provided with a pair of shaft parts projecting like a circular cylinder from the end parts for supporting the rotation body on the side wall end parts for rotation. The rotation body 11 is formed at the end part in the direction of the rotation axis center 15a with the sliding contact part 113 extending along the cam part 112 to the proximity of the tip of the cam part 112. That is, the sliding contact part 113 is formed in the proximity of the tip of the cam part 112. If the sliding contact part 113 is formed in the proximity of the tip of the cam part 112, large moment can be provided by the same frictional force as compared with the base part where the sliding contact part 113 is provided in the proximity of the base end side of the cam part 112. The tip of the sliding contact part 113 is formed roughly like a convex circular arc with the rotation axis center 15a as the circular arc center, as shown in the figure. The distance from the tip of the sliding contact part 113 to the rotation axis center 15a is formed longer than the distance from an arbitrary point on the sliding contact face 147 to the rotation axis center 15a. When the sliding contact part 113 comes in sliding contact with the sliding contact face 147, the sliding contact part 113 becomes elastically deformed and mounts the sliding contact face 147, producing a predetermined frictional force.

Figure 6:
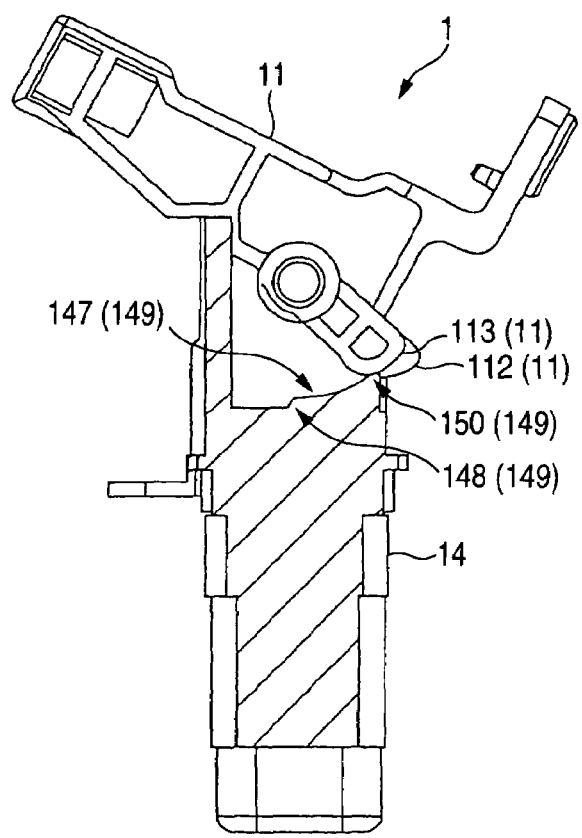
FIG. 6 is a sectional view to show the sliding contact part and the sliding contact face in a fully open position of the hinge according to the first embodiment of the invention.

The sliding contact part 113 and the sliding contact face 147 are not pressed against each other and the sliding contact part 113 does not become elastically deformed in the fully closed position shown in FIG. 1 or in the fully open position shown in FIG. 6. If the sliding contact part 113 is not pressed into contact with the sliding contact face 147 in the fully closed position or in the fully open position, degradation caused by needless elastic fatigue of the sliding contact part 113 can be prevented.

Next, the operation of the wedge body 12, the helical compression spring 13, and the cam part 112 will be discussed.

Figure 7A:
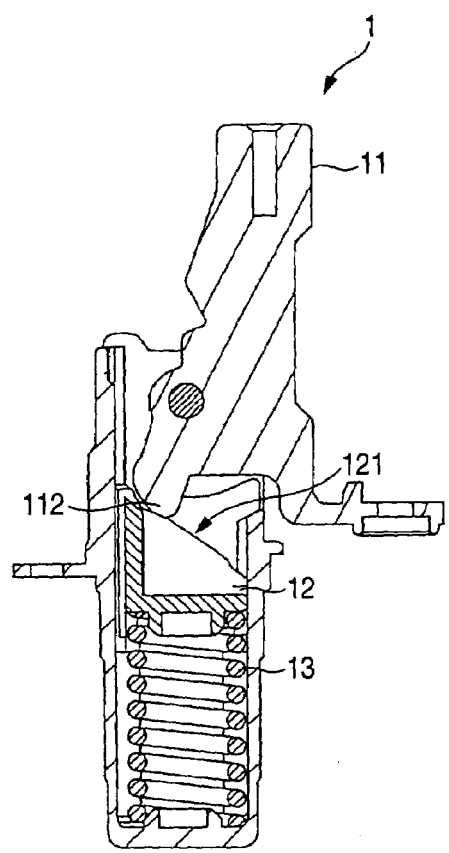
FIG. 7A is a sectional view of the hinge according to the first embodiment of the invention in the fully closed position and FIG. 7B is a sectional view of the hinge in the fully open position.
Figure 7B:
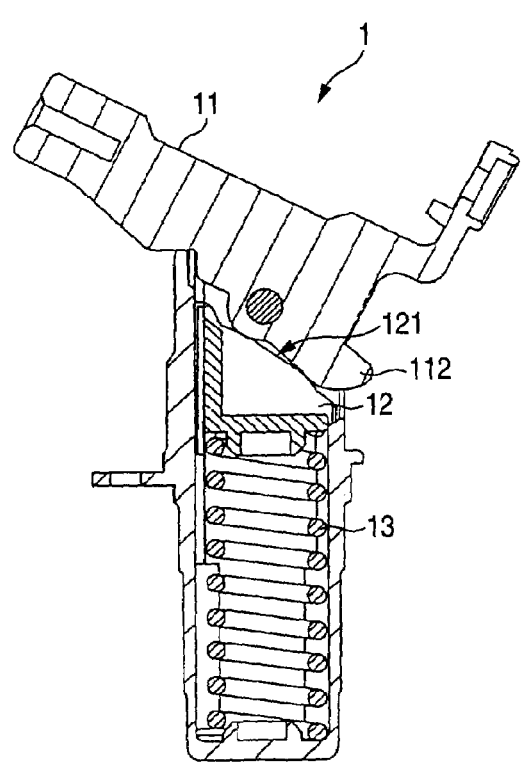

FIG. 7A is a drawing to show the hinge 1 when the scanner housing 3 is in the fully closed position and FIG. 7B is a drawing to show the hinge 1 when the scanner housing 3 is in the fully open position. In the fully closed position, the scanner housing 3 is placed on the top of the printer housing 2 and is located. In this state, the helical compression spring 13 is compressed by the cam part 112 to the side opposite to the opening. As the scanner housing 3 is opened so as to become the fully open position shown in FIG. 7B from the state, the wedge body 12 is urged toward the side of the rotation body 11 by the helical compression spring 13 in the process and accordingly, the slopes 121 come in sliding contact with the cam part 112 and moment in the opening direction acts on the rotation body 11. Therefore, the heavy scanner housing 3 would be able to be opened lightly by a small opening operation force. In contrast, when the scanner housing 3 is closed, the moment in the opening direction acts as a force against the moment in the closing direction caused by the own weight of the scanner housing 3 or the closing operation force, namely, a braking force, so that rapid drop of the scanner housing 3 in the closing direction thereof can be prevented.

Next, the operation of the sliding contact part 113 and the sliding contact face 147 will be discussed.

Figure 8:
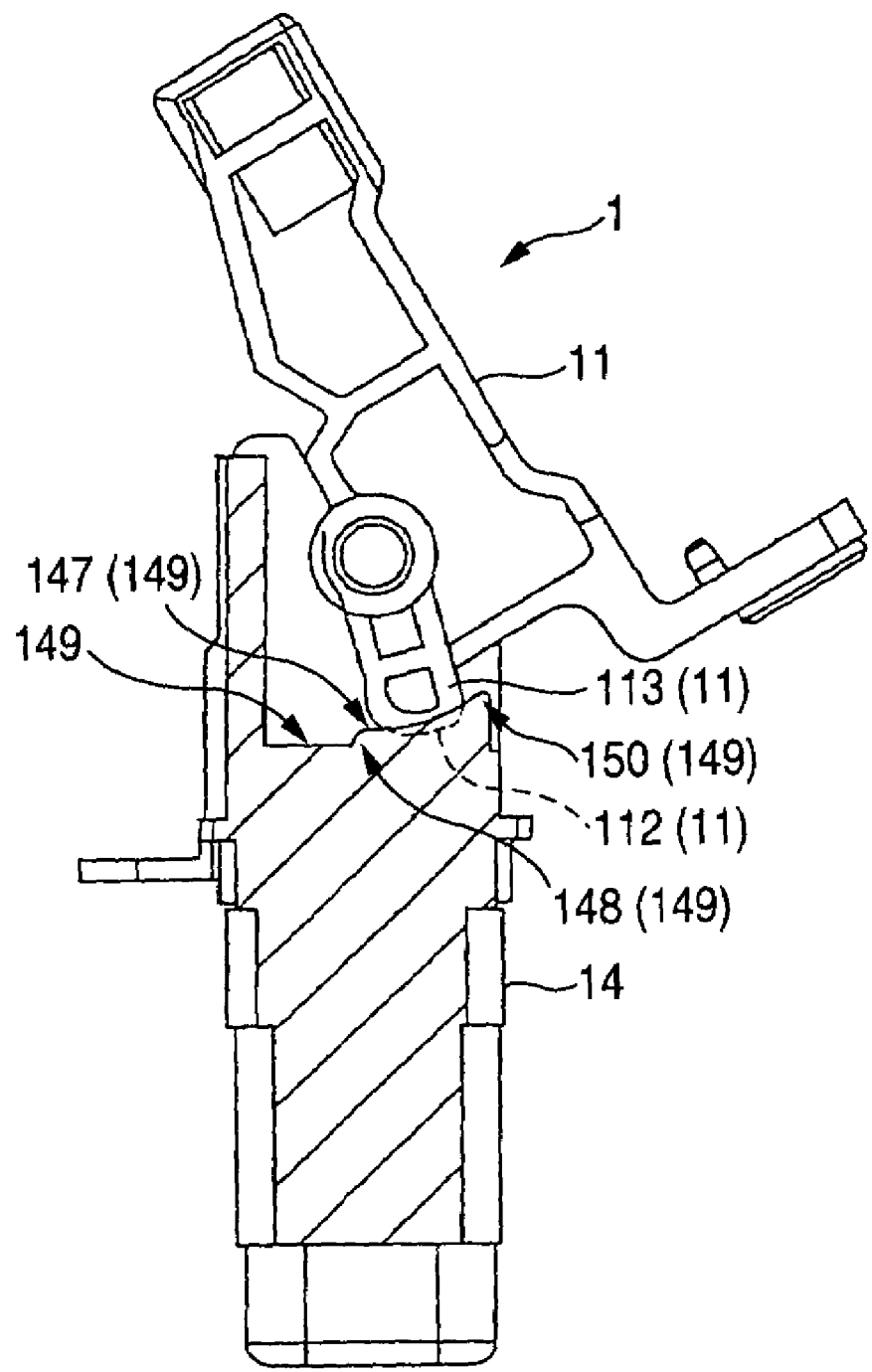
FIG. 8 is a sectional view to show the sliding contact part and the sliding contact face in an intermediate position of the hinge according to the first embodiment of the invention.

FIG. 8 is a sectional view to show the sliding contact part 113 and the sliding contact face 147 in an intermediate position between the fully closed position and the fully open position. As shown in the figure, the sliding contact part 113 becomes elastically deformed and climbs over the step 148 or a corner 150 and mounts the sliding contact face 147 and accordingly the sliding contact part 113 and the sliding contact face 147 come in sliding contact with each other in the process of placing the scanner housing 3 in the fully closed position from the fully open position or placing the scanner housing 3 in the fully open position from the fully closed position. Accordingly, a predetermined frictional force responsive to the rotation angle is produced between the sliding contact face 147 and the sliding contact part 113. To place the scanner housing 3 in the fully closed position from the fully open position, the produced frictional force acts as the moment in the opening direction against the moment in the closing direction of the scanner housing 3. That is, the frictional force acts as the force of braking drop of the scanner housing 3 in the closing direction thereof. Therefore, if the scanner housing 3 is heavier than a predetermined weight, the scanner housing 3 is slowly closed at decelerated drop speed. This prevents rapid drop of the scanner housing 3 under its own weight and an accident such that a hand is caught in the gap between the scanner housing 3 and the printer housing 2 can be prevented. If the scanner housing 3 is lighter than the predetermined weight, the scanner housing 3 stops at an arbitrary angle between the fully open position and the fully closed position.

With the hinge 1 according to the embodiment of the invention described above, as the wedge body 12 is urged toward the side of the rotation body 11 by the helical compression spring 13, the moment in the opening direction is made to act on the scanner housing 3; in addition, the frictional force produced as the sliding contact part 113 is brought into sliding contact with the sliding contact face 147 acts as the moment in the opening direction against the moment in the closing direction when the scanner housing 3 is closed. Thus, the hinge 1 makes it possible to prevent rapid drop of the scanner housing 3 in the closing direction thereof.

Further, in the hinge 1, the sliding contact part 113 and the sliding contact face 147 come in sliding contact with each other in the base part 14 for producing the frictional force required for braking, so that it is not necessary to provide the rotation body 11 with any portion covering the upper end margin of the base part 14 on the opening side thereof to produce a frictional force. Thus, the hinge 1 makes it possible to miniaturize the rotation body 11 as compared with the hinge 5 in the related art. Therefore, the shape of the hinge 1 can be miniaturized.

Further, in the hinge 1, the sliding contact part 113 extends to the side opposite to the opening as shown in FIG. 1, so that only the sliding contact part 113 can be lengthened without changing the size of the base part 14 or the rotation body 11. Thus, if the hinge 1 is of almost the same size as the hinge 5, the distance between the sliding contact part 113 and the rotation axis center 15a can be made longer than the distance between the shaft hole center of the hinge 5 and the protrusion 53. Thus, if the hinge 1 is of almost the same size as the hinge 5, the hinge 1 makes it possible to provide larger moment in the opening direction than the hinge 5 for braking the scanner housing 3 heavier than the hinge 5. Conversely, the scanner housing 3 of the same weight as the hinge 5 can be braked according to the smaller shape. Therefore, the shape can be miniaturized.

Further, according to the hinge 1, the frictional force occurring between the wedge body 12 and the inner wall face of the base part 14 gives the moment in the opening direction to the rotation body 11 when the scanner housing 3 is closed, so that the loads imposed on the sliding contact part 113 and the helical compression spring 13 can be relieved. Thus, according to the hinge 1, the shape can be furthermore miniaturized.

Second Embodiment

Figure 10:
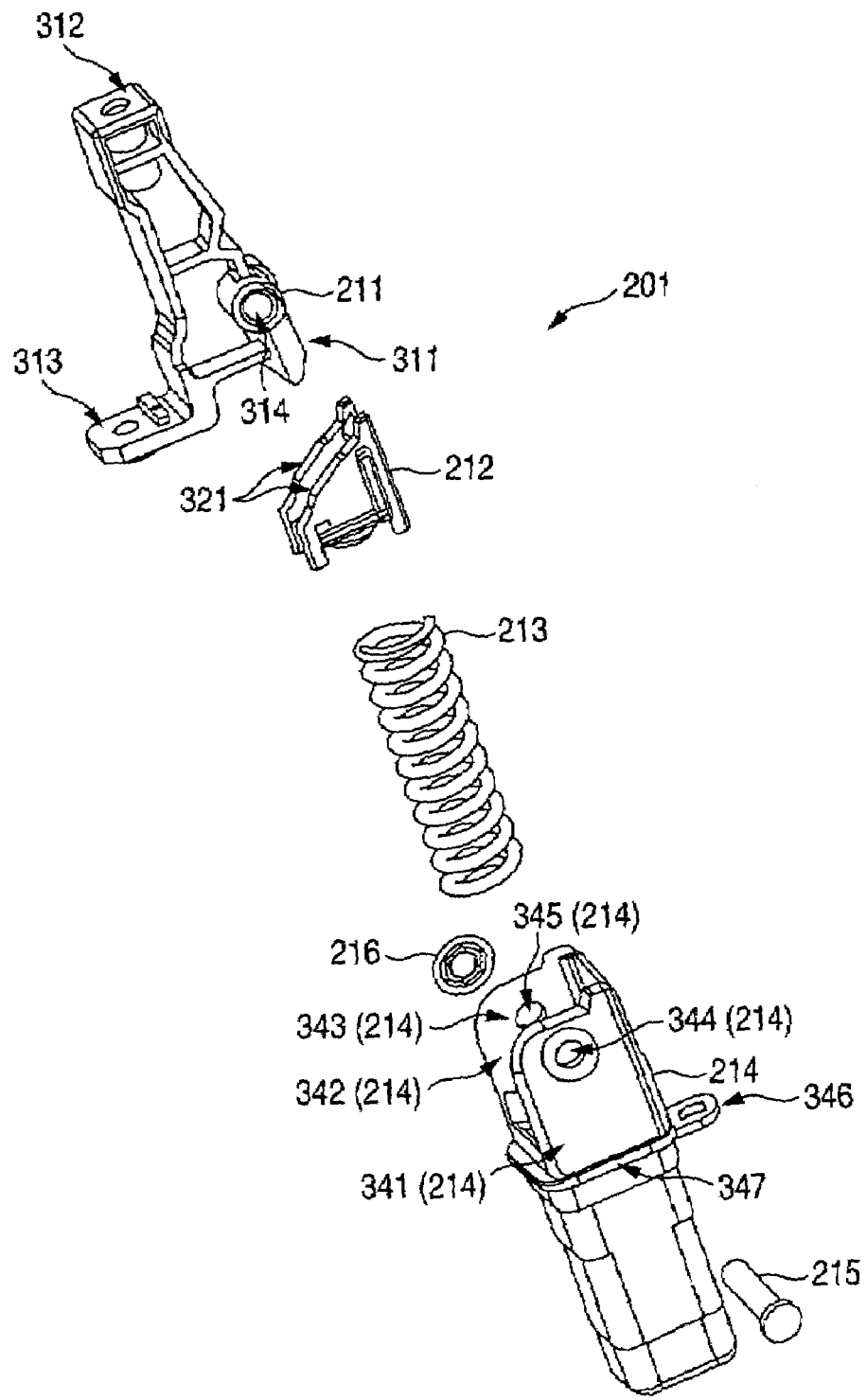
FIG. 10 is a drawing to show a hinge included in the image input/output apparatus according to the second embodiment of the invention.

FIG. 10 is a drawing to describe a configuration of a hinge 201 of the second embodiment for swingably joining the scanner housing 203 and the printer housing 202. The hinge 201 includes the rotation body 211, a wedge body 212, a helical compression spring 213 as an elastic member, a case (base part) 214, a metal shaft 215, and a ring member 216 for preventing detachment of the metal shaft 215. The helical compression spring 213 and the wedge body 212 are housed in the base part 214 in this order and after they are housed, the rotation body 211 is joined to the base part 214 for rotation with the metal shaft 215.

The base part 214 is formed of a raw material of polyacetal, etc., like a closed-end pipe, and has an opening 343. The base part 214 has four side walls. Shaft holes 344 and 345 for allowing the metal shaft 215 to pierce are formed in end parts of a pair of side walls 341 and 342 opposed to each other on the opening 343 side.

The helical compression spring 213 and the wedge body 212 are housed in the base part 214 in this order and after they are housed, the rotation body 211 is joined to the base part 214 for rotation with the metal shaft 215. An attachment part 346 and an overhang part 347 attached to the top face of the printer housing 202 are formed on the outer peripheral side wall of the base part 214 projecting in the perpendicular direction to the outer peripheral side wall.

The wedge body 212 has slopes 321 for coming in sliding contact with a cam part 311 described later, and is housed reciprocatably in the base part 214.

The rotation body 211 is made of nylon, etc., and is formed with has the cam part 311 projecting in the diametrical direction of the rotation body 211, a first fastening part 312 screwed to the ceiling of the scanner housing 203, and a second fastening part 313 screwed to the bottom of the scanner housing 203. As the metal shaft 215 pierces the bearing part 314, the rotation body 211 is supported on the end parts of the side walls 341 and 342 of the base part 214 opposed to each other for rotation. The rotation body 211 may be provided with a pair of shaft parts projecting like a circular cylinder from the end parts for supporting the rotation body on the side wall end parts for rotation. Further, although the sliding contact part as described in the first embodiment is not provided at the proximity of the tip end of the cam part 311, the sliding contact part may be provided on the rotation body 211.

Figure 11A:
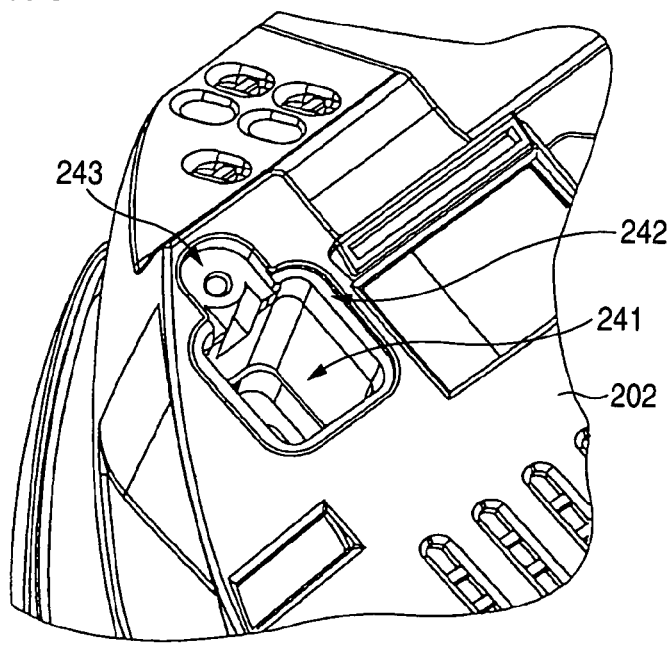
FIG. 11A is a drawing to show an opening in the image input/output apparatus according to the second embodiment of the invention and FIG. 11B is a drawing to show a state in which only a base part is inserted into another opening.
Figure 11B:
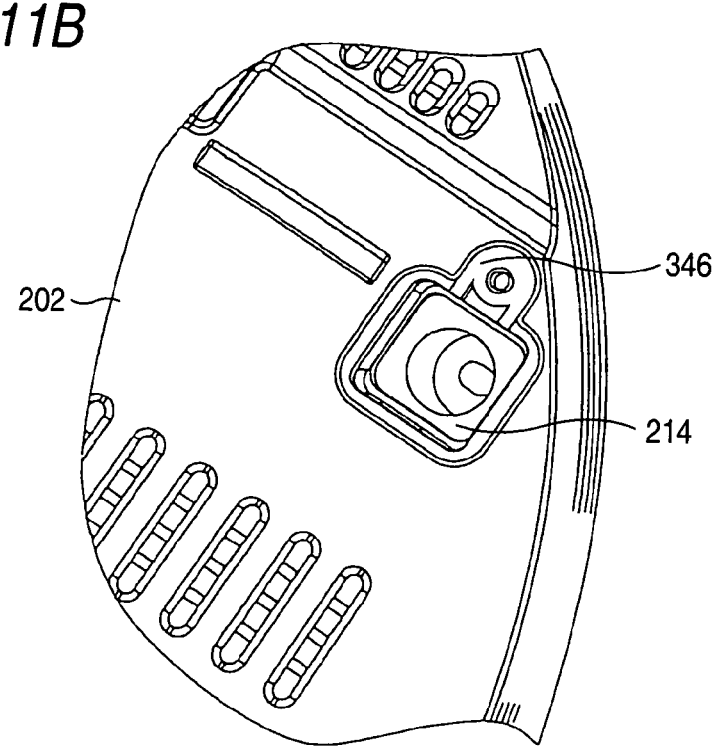

FIG. 11A is a drawing to show an opening 241 formed in the ceiling of the printer housing 202, and FIG. 11B shows a state in which only the base part 214 is inserted into another opening 241. Two openings 241 are formed in the printer housing 202 and the hinge 201 is fitted into each of the openings 241. That is, the scanner housing 203 and the printer housing 202 are swingably joined by the two hinges 201. FIGS. 11A and 11B show different openings 241. As shown in FIG. 11A, the opening 241 is formed in an opening margin with a step 242 for holding the overhang part 347 of the base part 214 and a recess part 243 for fixing the attachment part 346 of the base part 214. As shown in the figure, the recess part 243 is formed with a threaded hole for screwing the attachment part 346. As shown in FIG. 11B, the base part 214 is positioned so that the attachment part 346 is fitted into the recess part 243, and the base part 214 is inserted into the opening 241 and is fastened with a screw.

Figure 9:
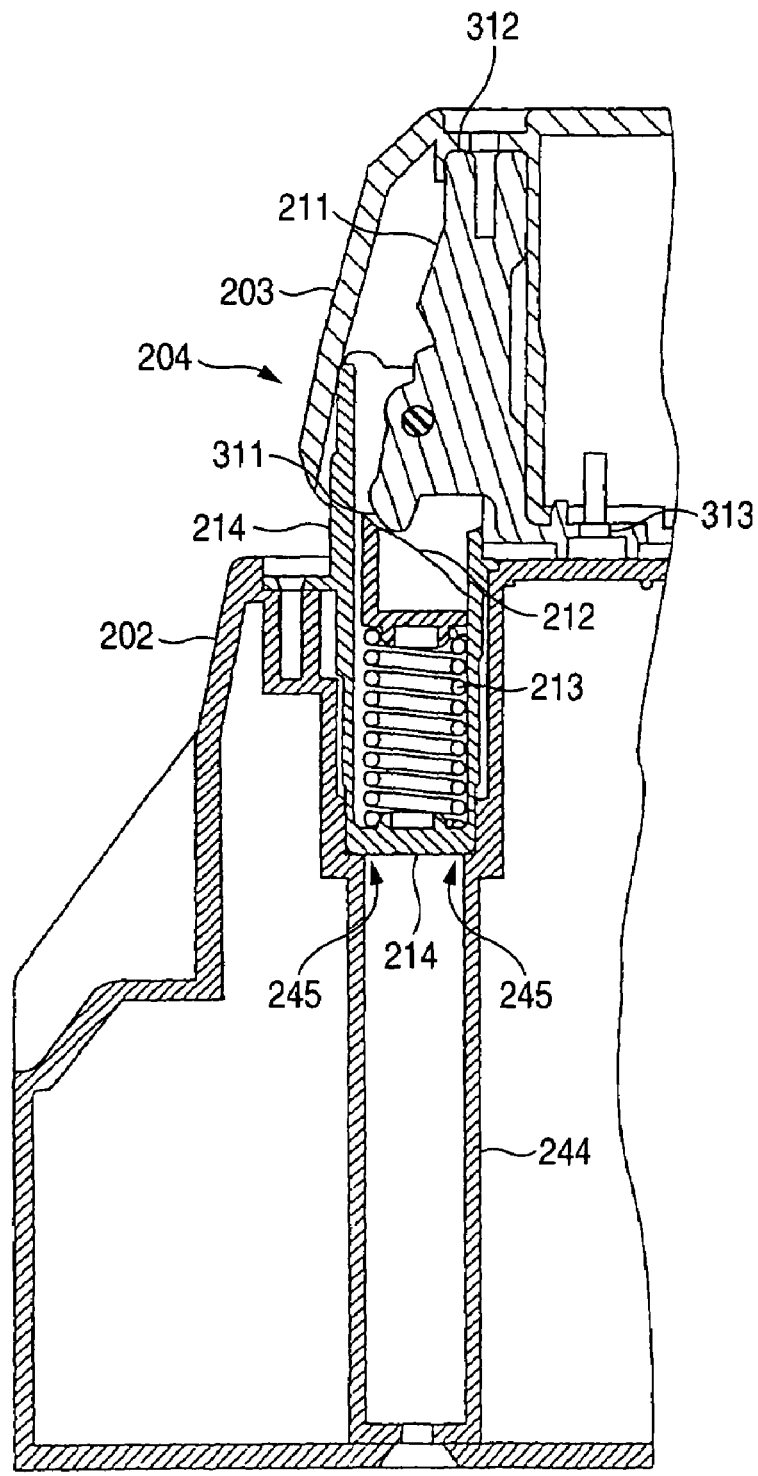
FIG. 9 is a sectional view of the periphery of an opening of an image input/output apparatus according to the second embodiment of the invention.

FIG. 9 is a sectional view of the periphery of the opening 241 of the multifunction processing machine 204. The printer housing 202 is formed with a tube part 244 extended like a tube from the opening 241 formed in the ceiling to the bottom of the printer housing 202. The tube part 244 is formed with a step 245 overhanging to the inside and supporting the base part 214 with the bottom of the base part 214 abutted against the step 245. The inner peripheral shape of the tube part 244 in the proximity of the step 245, the inner peripheral shape on the side of the opening 241 from the step 245 is formed as the same shape as the outer peripheral shape in the proximity of the bottom of the base part 214, and the bottom of the base part 214 is fitted into the tube part 244. Accordingly, the tube part 244 reinforces the base part 214 so that the base part 214 is not broken or warped if a rotation force in the opposite direction to the rotation body 211 is added to the base part 214. As shown in the figure, the bottom of the tube part 244 extends to the bottom of the printer housing 202 and is screwed to the printer housing 202.

Accordingly, the tube part 244 can reinforce the base part 214 more firmly as compared with the case where the bottom of the tube part 244 is not fixed to the printer housing 2. In the embodiment, the bottom of the tube part 244 is fixed to the bottom of the printer housing 202. However, unless the bottom of the tube part 244 is fixed to the printer housing 202, if the tube part 244 has a strength capable of reinforcing the base part 214 so that the base part 214 is not warped or broken, the bottom of the tube part 244 need not be fixed to the printer housing 202. In the embodiment, the bottom of the tube part 244 is fixed to the printer housing 202, but may be held.

As shown in FIG. 9, the first fastening part 312 of the rotation body 211 is screwed to the ceiling of the scanner housing 203, and the second fastening part 313 is screwed to the bottom of the scanner housing 203. Accordingly, the weight of the scanner housing 203 is distributed between the ceiling and the bottom. Therefore, the rotation body 211 can be attached without reinforcement of a fix member, and the structure can be more simplified. In the embodiment, both the first fastening part 312 and the second fastening part 313 are fixed as they are screwed, but only one may be fixed and the other may be held. If the other is held, for example, a screw becomes unnecessary and the structure can be more simplified and in addition, the screwing step becomes unnecessary and the manufacturing cost can be more reduced.

Next, the operation of the hinge 201 and the tube part 244 will be discussed.

Figure 12A:
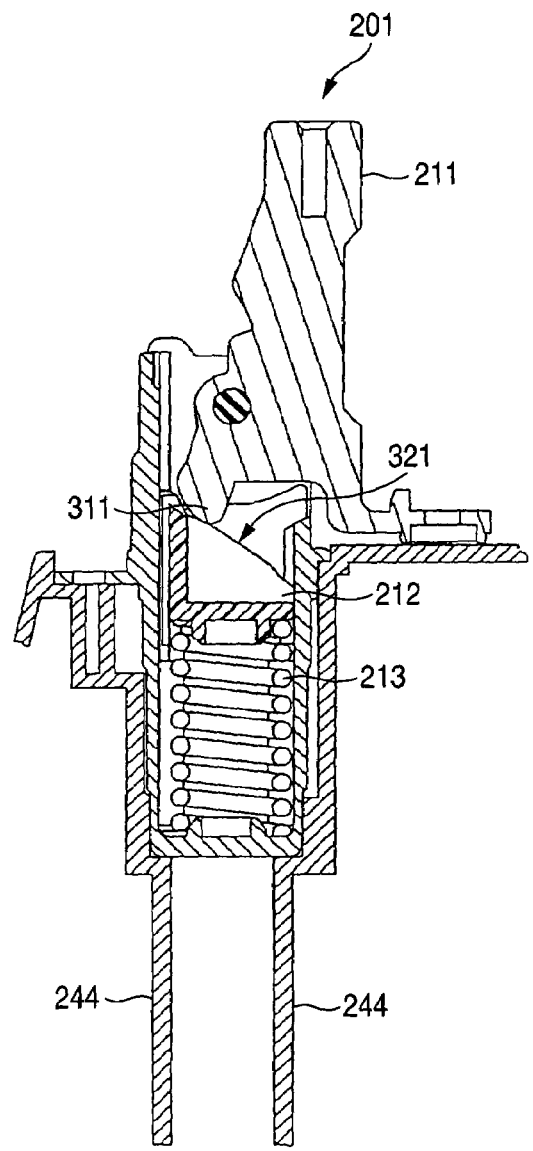
FIG. 12A is a drawing to show the hinge when a scanner housing of the image input/output apparatus according to the second embodiment of the invention is in a fully closed position and FIG. 12B is a drawing to show the hinge when the scanner housing is in a fully open position.
Figure 12B:
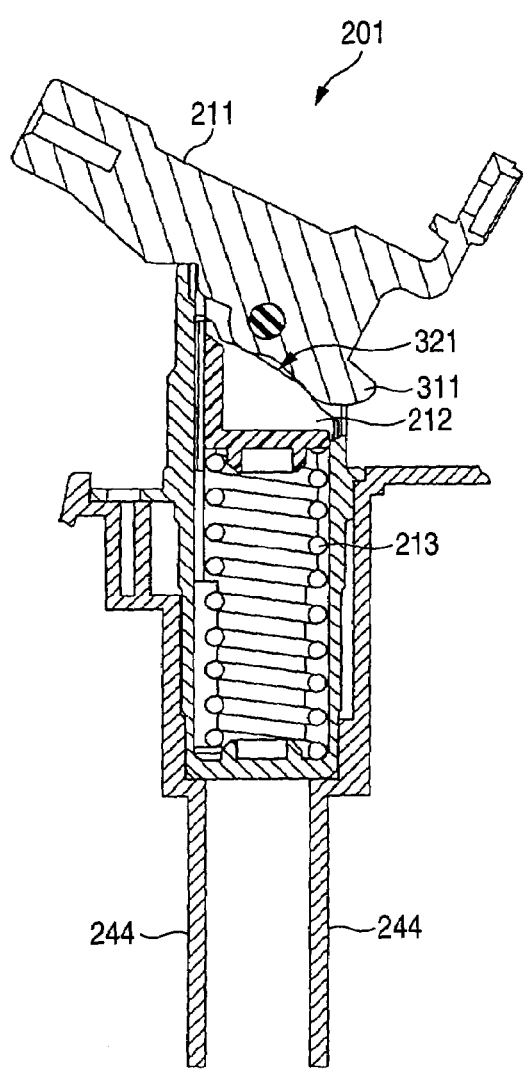
Figure 13:
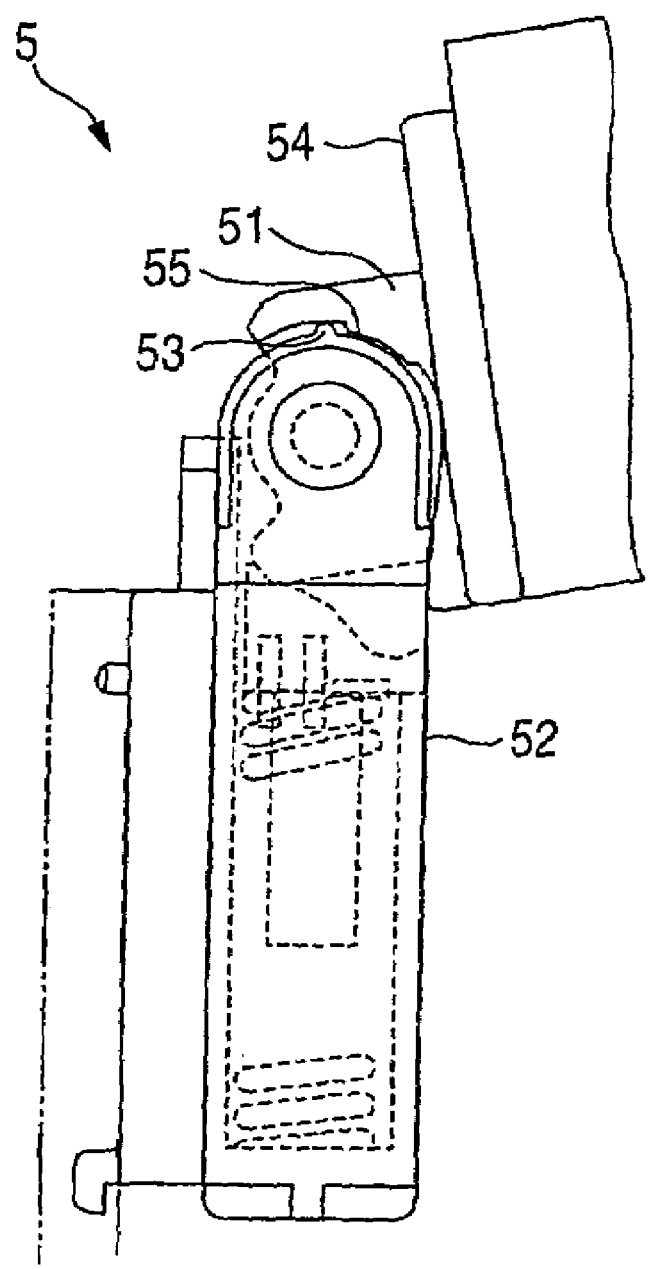
FIG. 13 is a drawing to show a hinge in a related art.
Figure 14:
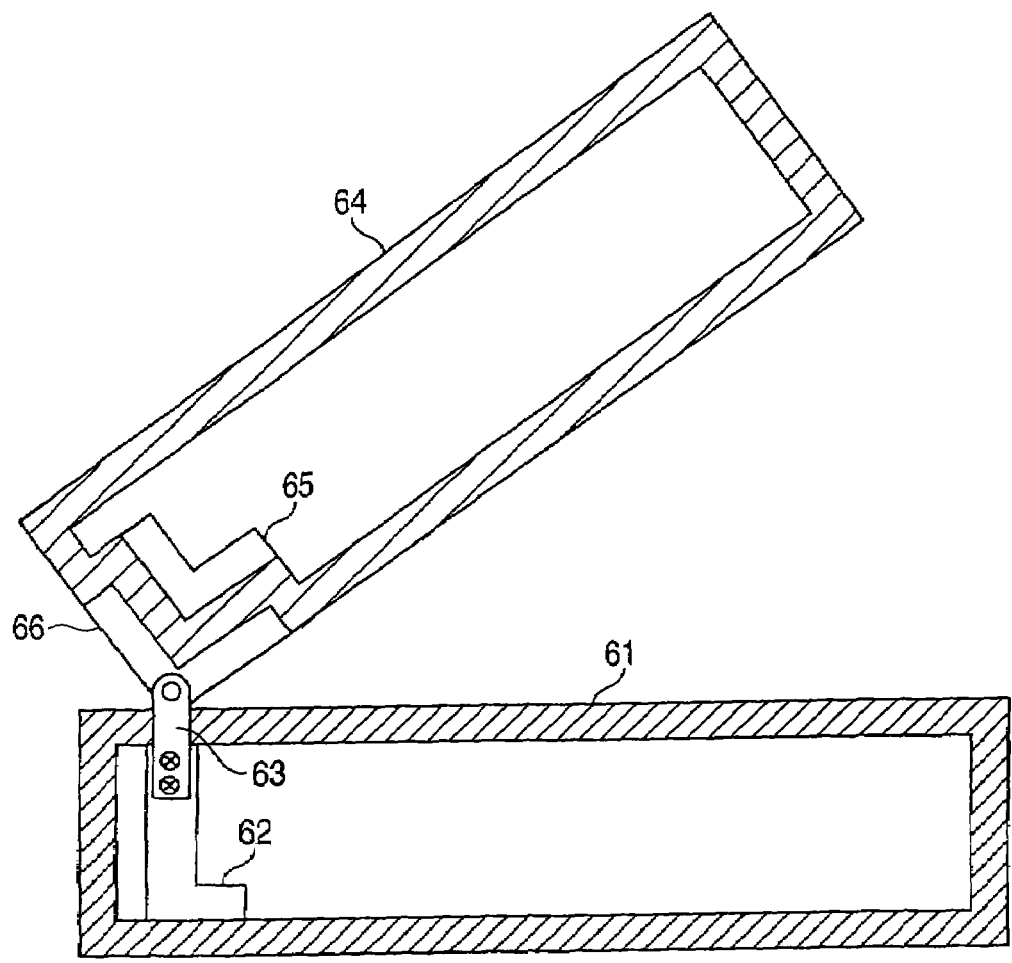
FIG. 14 is a schematic drawing to show an example of a reinforcement structure in a related art.

FIG. 12A is a drawing to show the hinge 201 when the scanner housing 203 is in the fully closed position and FIG. 12B is a drawing to show the hinge 201 when the scanner housing 203 is in the fully open position. In the fully closed position, the scanner housing 203 is placed on the top of the printer housing 202. In this state, the helical compression spring 213 is compressed by the cam part 311 to the side opposite to the opening. As the scanner housing 203 is opened so as to become the fully open position shown in FIG. 12B from the state, the wedge body 212 is urged toward the side of the rotation body 211 by the helical compression spring 213 in the process and accordingly, the slopes 321 come in sliding contact with the cam part 311. A rotation force is added to the rotation body 211 in the direction of bringing the scanner housing 203 away from the printer housing 202. That is, the moment in the opening direction acts on the rotation body 211. When the scanner housing 203 is closed, the moment in the opening direction acts as a force against the moment in the closing direction caused by the own weight of the scanner housing 203 or the closing operation force, namely, a braking force, so that if the scanner housing 203 is heavier than a predetermined weight, the scanner housing 203 is slowly closed at decelerated drop speed. If the scanner housing 203 is lighter than the predetermined weight, the scanner housing 203 stops at an arbitrary angle between the fully open position and the fully closed position. Accordingly, rapid drop of the scanner housing 203 in the closing direction thereof can be prevented. When the rotation force is added to the rotation body 211, a rotation force in the opposite direction to the rotation body 211 is added to the wedge body 212 by the reaction force. Accordingly, the rotation force in the opposite direction to the rotation body 211 is added to the base part 214.

According to the multifunction processing machine 204 according to the embodiment of the invention described above, the base part 214 is inserted into the tube part 244 and is reinforced. Thus, if the rotation force in the opposite direction to the rotation body 211 is added to the base part 214 as the scanner housing 203 swings, breakage or warpage does not occur. Therefore, a fix part to reinforce the base part 214 need not be used. Thus, according to the multifunction processing machine 204, the structure can be simplified. Accordingly, the manufacturing cost of the multifunction processing machine 204 can be reduced.

Further, according to the multifunction processing machine 4, the attachment part 346 of the base part 214 is fixed to the top face of the printer housing 202 and the base part 214 need not be fixed to a fix member in the printer housing 202, so that the base part 214 can be fixed to the printer housing 202 after completion of assembling the printer housing 202. Conversely, the base part 214 can be removed without disassembling the printer housing 202. Thus, maintenance of the multifunction processing machine 204 is facilitated.

What is claimed is:

1. A hinge with which an open/closed body is swingably joined to a main body, the hinge comprising:
   a tubular base part being attached to one of the main body and the open/closed body;
   a rotation body being attached to another of the main body and the open/closed body, and rotationally supported by opposite side wall end parts of said base part, said rotation body having a cam part;
   a wedge body being reciprocatably housed in said base part and having a slope for coming in sliding contact with the cam part according to a rotation of said rotation body;
   an elastic member being housed in said base part for urging said wedge body toward said rotation body;
   a sliding contact face being formed on an inner wall of said base part in a side of said wedge body with respect to a rotation axis of said rotation body, the sliding contact face having a concave surface defined by a parallel move path of a line almost parallel with the rotation axis; and
   a sliding contact part being formed in said rotation body for coming in sliding contact with said sliding contact face when said rotation body rotates.

2. The hinge as claimed in claim 1 wherein said sliding contact part is formed in a proximity of a tip of the cam part.

3. The hinge as claimed in claim 1, wherein said wedge body is pressed into the base part.

4. The hinge as claimed in claim 1, wherein said sliding contact face and said sliding contact part are disengaged against each other when said open/closed body is in a fully closed position or in a fully open position.

5. The hinge as claimed in claim 1, wherein the distance from the rotation axis to an arbitrary point on said sliding contact face varies so that a frictional force occurring between said sliding contact part and said sliding contact face varies in response to the rotation angle of said rotation body.

6. An image input/output apparatus comprising:
a first housing for housing a printing unit;
a second housing for housing an image read unit being placed on said first housing; and
a hinge for swingably joining said second housing to said first housing, the hinge including:
a tubular base part being attached to one of the main body and the open/closed body;
a rotation body being attached to another of the main body and the open/closed body, and rotationally supported by opposite side wall end parts of said base part, said rotation body having a cam part;
a wedge body being reciprocatably housed in said base part and having a slope for coming in sliding contact with the cam part according to a rotation of said rotation body;
an elastic member being housed in said base part for urging said wedge body toward said rotation body;
a sliding contact face being formed on an inner wall of said base part in a side of said wedge body with respect to a rotation axis of said rotation body, the sliding contact face having a concave surface defined by a parallel move path of a line almost parallel with the rotation axis; and
a sliding contact part being formed in said rotation body for coming in sliding contact with said sliding contact face when said rotation body rotates.

7. The image input/output apparatus claimed in claim 6, wherein said sliding contact part is formed in a proximity of a tip of the cam part.

8. The image input/output apparatus as claimed in claim 6, wherein said wedge body is pressed into the base part.

9. The image input/output apparatus as claimed in claim 6, wherein said sliding contact face and said sliding contact part are disengaged against each other when said open/closed body is in a fully closed position or in a fully open position.

10. The image input/output apparatus as claimed in claim 6, wherein a distance from the rotation axis to an arbitrary point on said sliding contact face varies so that a frictional force occurring between said sliding contact part and said sliding contact face varies in response to the rotation angle of said rotation body.

11. The hinge as claimed in claim 1, wherein a first distance from a tip of said sliding contact part to said rotation axis is longer than a second distance from an arbitrary point on said sliding contact face.

* * * * *